Oct. 31, 1967     A. W. TOWNSEND     3,350,121

BALL AND SOCKET JOINTS

Filed Jan. 22, 1965

INVENTOR
Albert W. Townsend
BY Winter and Tockman
ATTORNEY

United States Patent Office 3,350,121
Patented Oct. 31, 1967

3,350,121
BALL AND SOCKET JOINTS
Albert W. Townsend, Leamington Spa, England, assignor to Automotive Products Company Limited, Leamington Spa, England
Filed Jan. 22, 1965, Ser. No. 427,364
Claims priority, application Great Britain, Feb. 6, 1964, 5,096/64; Mar. 17, 1964, 11,259/64
5 Claims. (Cl. 287—90)

ABSTRACT OF THE DISCLOSURE

A ball and socket joint is provided with a housing having upper and lower bearing members which seat the head of a ball stud. The depth of the socket is so chosen in relation to the axial dimensions of the ball stud head and bearing members that a closure disc for one end of the socket must be deformed beyond its elastic limit upon assembly of the joint and results in residual resilience of the disc providing the load applied to the bearing members.

---

This invention relates to ball-and-socket joints of the kind commonly used in the steering linkage and front suspension systems of motor vehicles, and for like purposes.

In such joints, the head of the ball stud is usually engaged between two bearing surfaces in the socket, one of which is provided on a bearing member retained in an initially open end of the socket by any convenient means, for example by peening over the end of the socket wall. Usually, in order to take up wear, the said bearing member is backed up by a spring mounted between it and a closure disc bearing on the peened-over edge or on equivalent retaining means.

It is found that, under certain circumstances, such springs tend to yield as the result of dynamic loads imposed on the joints due to up-and-down movements of the vehicle wheels on uneven roads, and so to cause rattling of the joints.

It is the object of the present invention to provide an improved form of ball-and-socket joint in which the possibility of rattling is eliminated in a reliable and economical manner.

According to the invention, in a ball-and-socket joint comprising a socket, a ball stud having its head positioned between a bearing surface surrounding an opening in one end of the socket through which the stem of the ball stud projects and a bearing member, and resilient means being provided to urge said bearing member resiliently towards said bearing surface, said resilient means comprise a resilient metal disc which acts at its centre on the bearing member and is supported at its edge in the socket, the disc being so deformed during assembly of the joint that its resilience causes it to exert a load on the said bearing member.

The resilient metal disc may be deformed during assembly beyond its elastic limit so that the load exerted on the bearing member depends on the residual resilience of the disc.

The said disc may be formed with radial undulations of rounded or V-form and the centre portion thereof may be offset to one side of the plane of its edge.

The invention is hereinafter described with reference to the accompanying drawing, in which.

Figure 1:
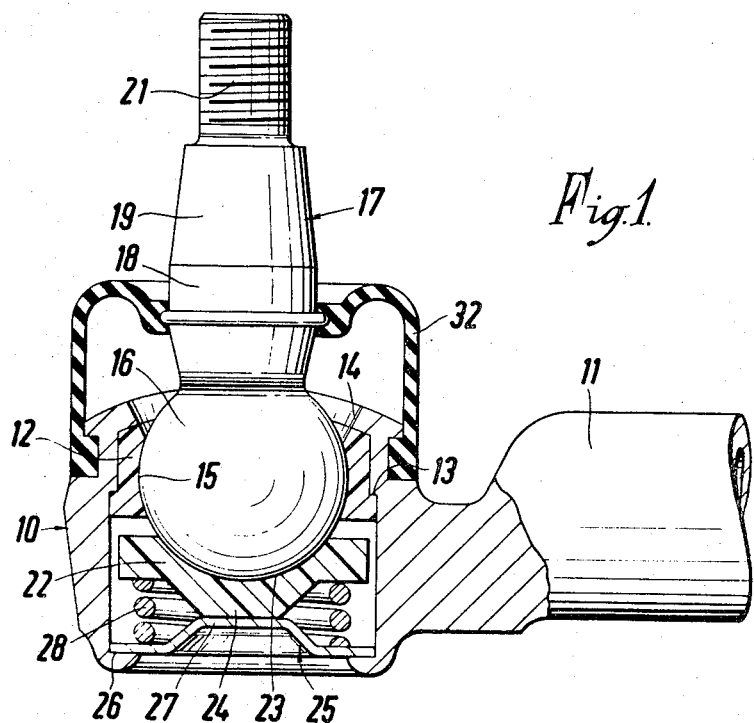
FIGURE 1 is a sectional elevation of one form of ball-and-socket joint embodying the invention.

Referring to FIGURE 1 of the drawings, the ball-and-socket joint comprises a tubular socket 10 formed at one end of a stem 11 by means of which the said socket can be secured to the end of a tie rod, track rod or similar part of a steering or suspension linkage. An annular bearing member 12, supported against a shoulder 13 in the socket and partially covered by an internal flange 14 at one end of the socket, provides a part-spherical bearing surface 15 to engage the spherical head 16 of a ball stud 17 the stem 18 of which projects outwardly through the opening surrounded by the flange 14, the stem 18 having the usual tapered part 19 and screw-threaded end 21 to enable it to be secured to another part of the steering or suspension linkage.

Another bearing member 22 having a part-spherical depression 23 to receive the end of the ball head 16 is fitted into the socket from its end remote from the flange 14. This bearing member 22 has a central boss 24 on its side opposite to the depression 23, and a resilient metal disc 25, resting at its edge on a ledge 26 formed by peeening over a rim provided around the end of the socket, has a central portion 27 offset from the plane of its edge to engage the boss 24 and thus apply a resilient load urging the bearing member 22 against the ball head and also urging the said ball head against the bearing member 12, which is in turn urged against the shoulder 13 in the socket. Thus the elements of the joint are held firmly in contact one with another and cannot move under dynamic loads to cause rattling.

A coiled compression spring 28 may be provided between the bearing member 22 and the supported edge of the disc 25 so that, should the parts, due to wear, cease to be subjected to load by the disc 25, there will still be a substantial spring load to hold them together and the joint will remain serviceable.

The tolerances permitted in the manufacture of the parts of the joint must be such that the disc 25 is subjected to deformation during assembly, since such deformation introduces the stress in the disc which provides the resilient load.

To permit the use of greater tolerances than would be permissible if it were required to deform the disc only within its elastic limit, and to ensure consistent loading in different joints, the depth of the socket may be so chosen in relation to the axial dimensions of the ball stud head and bearing members that the disc must suffer deformation beyond its elastic limit when the joint is assembled and the edge of the socket is peened over to hold the said disc in place. Thus the deformation of the disc can vary within quite wide limits depending on the combination of tolerances, but the load applied to the bearings, which will depend on the residual resilience in the disc, will depend on the characteristics of the disc itself and so will be substantially uniform in all joints.

Figure 2:
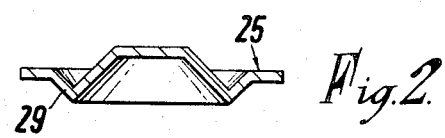
FIGURE 2 is a sectional elevation of a modified form of resilient disc.
Figure 3:
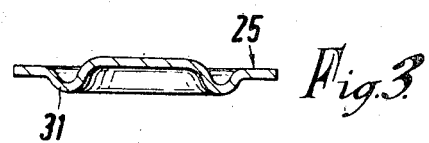
FIGURE 3 is a similar sectional elevation showing another form of resilient disc.

The resilient metal disc 25, instead of being of the form shown in FIGURE 1, may be radially undulated as shown in FIGURE 2 or FIGURE 3, the undulation in FIGURE 2 being V-shaped as shown at 29, and in FIGURE 3 being rounded as shown at 31.

A flexible "boot" or dust cover may be provided as shown at 32 in FIGURE 1 to keep water and other foreign matter out of the joint.

It will be understood that the particular form of joint shown in FIGURE 1 is illustrated only by way of example, and that the invention may be applied to other forms of ball-and-socket joint. For example, the bearing member 12 may be omitted and a bearing surface for the ball stud head provided in the socket itself.

I claim:

1. A ball and socket joint comprising a socket with openings in the opposite ends thereof, a ball stud extending through one opening; a ball on the end of said stud disposed in said socket adjacent said one stud opening, a first bearing member in said socket surrounding said one stud opening and in engagement with said ball, a second bearing member in said socket secured in said socket opposite said one opening and in engagement with said ball, a resilient metal disk secured in said socket in contact with said second bearing member and adjacent the other opening in said socket, said disk being in contact with said second bearing member at its central area, said disk having a circumferential rim in contact with an inturned annular lip adjacent said other opening of said socket and the axial dimensions of said ball and bearing means and socket being such that said disk is deformed in said secured position beyond its elastic limit and exerts a load on said second bearing member resulting from residual resilience of the disk.

2. The ball-and-socket joint of claim 1, wherein the resilient metal disk is formed with radial undulations.

3. The ball-and-socket joint of claim 1, wherein the center portion of the resilient metal disk is offset to one side of the plane of its rim.

4. The ball-and-socket joint of claim 1, wherein the first bearing member is a part-spherical surface formed supported by a shoulder in said socket.

5. A ball-and-socket as in claim 1, wherein a coiled compression spring is provided which acts between the rim of the disk and the second bearing member.

References Cited

UNITED STATES PATENTS

| | | | |
|---|---|---|---|
| 2,695,185 | 11/1954 | Latzen | 287—90 |
| 3,226,141 | 12/1965 | Sullivan | 287—87 |

FOREIGN PATENTS

| | | |
|---|---|---|
| 483,279 | 5/1952 | Canada. |
| 539,196 | 2/1956 | Italy. |

CARL W. TOMLIN, *Primary Examiner.*

A. V. KUNDRAT, *Assistant Examiner.*